United States Patent Office 3,459,762
Patented Aug. 5, 1969

3,459,762
THIOETHERS DERIVED FROM POLYHALO-
GENATED ALKYLENE OXIDES
Michael Kokorudz and William K. Langdon, Grosse Ile, and William W. Levis, Jr., Wyandotte, Mich., assignors to Wyandotte Chemicals Corporation, Wyandotte, Mich., a corporation of Michigan
No Drawing. Filed Mar. 31, 1966, Ser. No. 538,988
Int. Cl. C07c 149/10, 149/30; C07d 91/44
U.S. Cl. 260—306                    5 Claims

ABSTRACT OF THE DISCLOSURE

Thioethers are prepared by the reaction of 3,3,3-trichloropropylene oxide or 3,3-dichloropropylene oxide with a compound containing at least one sulfhydryl group such as thiophenol or ethanedithiol. The thioethers are extremely stable plasticizers, have selective pesticidal activity, and may be employed in the preparation of non-burning foams.

---

The present invention relates to novel thioethers derived from polyhalogenated alkylene oxides. More particularly, the invention relates to thioethers prepared by the reaction of 3,3,3-trichloropropylene oxide or 3,3-dichloropropylene oxide with compounds containing at least one sulfhydryl (—SH) group. The novel thioethers are useful intermediates in the preparation of non-burning foams, are extremely stable plasticizers, particularly for polyesters, have selective pesticidal activity, and may be oxyalkylated to yield surface active agents.

The novel compounds of the present invention may be represented by the following formula:

$$R—(S—A)_x$$

wherein:

R is hydrogen, a hydrocarbon radical or a heterocyclic radical,

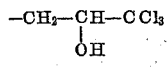

or

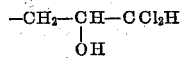

and

X is a number from 1 to 3.

The R in the above formula may also be defined as the residue of a thiol compound, that is, a thiol compound with the sulfhydryl groups removed. For example, when the thiol compound is thiophenol, R is phenyl; when the thiol compound is ethanedithiol, R is ethylene; and when the thiol compound is propanetrithiol, R is

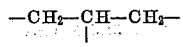

As is apparent from the above formula, the thioethers of the present invention are characterized by pendant polyhalogenous alkyl groups and by reactive hydroxyl groups. The novel thioethers are prepared by the reaction of 3,3,3-trichloropropylene oxide or 3,3-dichloropropylene oxide with thiols.

The polyhalogenous propylene oxides employed in the present invention may be prepared by known methods such as by the dehydrohalogenation of the appropriate polyhalogenated secondary alcohol in sodium hydroxide solution. For example, 3,3-dichloropropylene oxide may be prepared by the dehydrohalogenation of 1,3,3-trichloro-2-propanol. 3,3,3-trichloropropylene oxide may be prepared by the dehydrohalogenation of 1,3,3,3-tetrachloro-2-propanol. The propanol used in the process may in turn be prepared in known manner by the reduction of the appropriate halogenated acetone with aluminum isopropoxide in isopropanol. 3,3,3-trichloropropylene oxide may also be prepared by the reaction of chloral with diazomethane in ether solution, as is described by S. Schlotterbeck, Ber. 42, 2561 (1909).

A mixture of the above-described polyhalogenous propylene oxides may be employed, as well as mixtures of the above-described oxides with monohalogenous or nonhalogenous alkylene oxides. Suitable alkylene oxides which may be used as co-reactants with the polyhalogenous propylene oxides are the alkylene oxides which are either saturated or free from other than aromatic unsaturation. They include lower-alkylene oxides such as ethylene, propylene, butylene, and isobutylene oxides, other alkylene oxides such as dodecene oxide, epichlorohydrin and epibromohydrin; aromatic alkylene oxides such as styrene oxide and chlorostyrene oxide; and epoxy ethers. When mixtures of polyhalogenous and non-polyhalogenous alkylene oxides are used to impart fire resistance into a composition, the amount of the non-polyhalogenous alkylene oxide should be limited. Thus, when a mono- or non-halogenous alkylene oxide is employed as part of the starting alkylene oxide reactant, the polyhalogenous propylene oxide component should comprise at least 10% by weight of the mixture, and a considerably higher proportion is preferred.

Thiols which may be employed in the present invention are those compounds containing at least one sulfhydryl group. Representative compounds include hydrogen sulfide, aliphatic thiols such as methanethiol, ethanedithiol, propanetrithiol, dodecylmercaptan and thioglycollic acid, aromatic thiols such as thiophenol, benzylmercaptan and beta-naphthyl mercaptan; and heterocyclic thiols such as mercaptobenzothiazole, mercaptothiazoline, ethyl-2-mercaptothiazole and phenyl-2-mercaptothiazole. Mixtures of any of the above may also be employed.

The amounts of reactants which may be employed in the preparation of the compounds of the present invention may vary considerably. Generally, however, stoichiometrically equivalent amounts of reactants will be employed. For example, a thioether may be prepared from methanethiol and trichloropropylene oxide by the reaction of one mole of methanethiol with one mole of trichloropropylene oxide, whereas a thioether derived from ethanedithiol and trichloropropylene oxide may be prepared by the reaction of one mole of ethanedithiol with two moles of trichloropropylene oxide. Stated otherwise, generally one mole of polyhalogenated propylene oxide will be employed for each sulfhydryl group of the thiol compound.

The thioethers of the present invention may be prepared according to several different procedures. Thus, a catalyst may be used to accelerate the reaction between the thiol and the polyhalogenated alkylene oxide. If a catalyst is used, an acid catalyst is preferred. Illustrative catalysts include those of the Friedel-Crafts type such as boron trifluoride, ferric chloride, anhydrous aluminum trichloride, zinc chloride, stannic chloride, antimony trifluoride, and complexes of these catalysts, such as boron trifluoride etherates; acid-type catalysts such as hydrofluoric acid, acid fluoride salts such as potassium acid fluoride, fluoboric acid, fluosilicic acid and fluoplumbic acid, perchloric acid, sulfuric acid, p-toluene sulfonic acid and phosphoric acid; and other catalysts such as antimony pentachloride, and the alkoxides and alcoholates of aluminum. The reaction may be carried out at temperatures of from 20° C. to about 200° C., preferably from 20° C. to 100° C. It is preferred to carry out the reaction in an inert solvent, although the reaction may be carried out in the absence of a solvent. Any of the standard inert solvents may be employed including aromatic hydrocarbons such as benzene and toluene, and halogenated hydrocarbons such as carbon tetrachloride, dichlorodifluoromethane, trichloroethane and perchloroethylene.

The polyhalogenated thioethers of the present invention range from liquids to solids and range in color from clear and light yellow to dark. They are useful for most of the applications in which polyhydroxy ethers and thioethers are presently used, and especially for applications where the high halogen content of the polyhydroxy ethers and thioethers of the present invention can be of special value. They are also useful for certain applications in which conventional polyhydroxy ethers and thioethers are not presently used, but for which applications the high halogen content and properties of the compounds of the present invention would render them usable.

The compounds of the present invention may be reacted with chain-forming polyfunctional compounds containing functional groups capable of reacting with the free hydroxy groups of the ether to give more complex polymeric products. Suitable polyfunctional compounds include, among others, polycarboxylic acids and acid anhydrides, polyisocyanates, and polyepoxides. The products so obtained have a wide variety of physical and chemical properties and may be used in such diverse applications as coatings and paints, elastomers, rubbers, foams and fibers. As an example of such a utilization, the products of the present invention may be reacted with organic diisocyanates to give polyurethane compositions which may be used as elastomers and coatings. Such polyurethane compositions may be expanded by the use of a blowing agent to give soft and flexible to hard and rigid foams. The polyurethanes so obtained are generally self-extinguishing, and frequently non-burning. Moreover, the fire-resistant properties are permanent and are obtained without substantial diminution of other desirable properties of the composition. The products of the present invention may also be reacted with compounds which introduce hydrophilic groups into the molecule, for example, ethylene oxide to give surface active agents.

The following examples illustrate the invention. All parts are by weight unless otherwise stated.

Example I

A reaction vessel equipped with a thermometer, stirrer and heat exchange means was charged with 177.5 parts of 3,3,3-trichloropropylene oxide, 110.2 parts of thiophenol and one part of p-toluene sulfonic acid. The charge was stirred for about ten hours at temperatures between 70° C. and 115° C. At this time, the charge was cooled to 70° C. and 220 parts of benzene was added to the vessel. A colorless, crystalline product was separated from the reaction mixture by filtration. The filtered product was washed with hexane. 3,3,3-trichloro-1-phenylthio-2-propanol, a colorless crystalline product, 231 parts (90% yield), was obtained. The product had a melting point of 53° C. to 55° C.

*Analysis.*—Calculated for $C_9H_9Cl_3OS$: C, 39.77; H, 3.31. Found: C, 39.59; H, 3.29.

The product exhibited good herbicidal, fungicidal and insecticidal activity.

Example II

A reaction vessel equipped as in Example I was charged with 124.4 parts of 3,3,3-trichloropropylene oxide, 142.2 parts of 1-dodecanethiol and one part of p-toluene sulfonic acid. The charge was stirred for five hours at 125° C. to 130° C. At this time, excess 3,3,3-trichloropropylene oxide was stripped from the reaction product by distillation at 60° C. and at 2 mm. of mercury. 3,3,3-trichloro-1-(1-dodecylthio)-2-propanol, a light brown liquid, 255 parts (100% yield), was obtained which was to give a colorless liquid. This liquid boiled at 98° C. at 0.1 mm. of mercury and recorded an $n_D^{25}$ of 1.4979.

*Analysis.*—Calculated for $C_{15}H_{29}Cl_3OS$: C, 49.52; H, 7.98. Found: C, 47.76; H, 7.90.

The product exhibited selective insecticidal and fungicidal activity.

Example III

A reaction vessel equipped as in Example I was charged with 167 parts of mercaptobenzothiazole in 243 parts of toluene containing one part of p-toluene sulfonic acid. To this charge, was added 161.5 parts of trichloropropylene oxide in a period of one and one-half hours at temperatures of 70° C. to 100° C. The charge was then stirred for about four hours at 100° C. and 87 parts of toluene was then added. The reaction mixture was cooled to 50° C. and a crystalline product separated from the mixture. 3,3,3-trichloro-1-(benzothiabolylthio)-2 - propanol, a colorless crystalline product, was obtained having a melting point of 107° C. to 108° C.

*Analysis.*—Calculated for $C_{10}H_8Cl_3NOS_2$: C, 37.61; H, 2.51; N, 4.39. Found: C, 36.05; H, 2.20; N, 4.05.

The product exhibited selective bactericidal and insecticidal activity.

Example IV

Following the procedure of Example I, a thioether is prepared from 94 parts of ethanedithiol and 260 parts of 3,3-dichloropropylene oxide. The reaction occurs at from 70° C. to 110° C. for about four hours. Bis-(3,3-dichloro-2-hydroxypropanethio)ethane, a colorless product, is obtained in yields of about 90%.

What is claimed is:
1. A thioether of the formula:

$$R-(S-A)_x$$

wherein
R is hydrogen, saturated aliphatic hydrocarbon of 1–12 carbon atoms, phenyl, beta-naphthyl, benzyl, or mercaptobenzothiazole,
A is

or

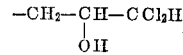

and
$x$ is a number from 1 to 3.
2. A thioether of claim 1 when $x$ is one.
3. A thioether of claim 1 when R is saturated aliphatic hydrocarbon of 1–12 carbon atoms.
4. A thioether of claim 1 when A is

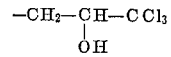

5. A thioether of claim 1 when R is saturated alphatic hydrocarbon of 1–12 carbon atoms, A is

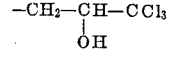

and $x$ is one.

References Cited

UNITED STATES PATENTS 3,210,243   10/1965   Goodhue et al.

OTHER REFERENCES

Kuznetsova et al.: Chem. Abst., vol. 63, col. 5623–4 (1965, Aug. 30, 1965), QDI, A51.

Nenitzescu et al.: Berichte, vol. 68, pp. 587–91 (1935), QDI, D4.

HENRY R. JILES, Primary Examiner

N. TROUSOF, Assistant Examiner

U.S. Cl. X.R.

71—90, 98; 106—15; 117—136; 252—3; 260—2, 75, 77, 79, 302, 306, 348, 609, 999

PO-1050
(5/69)

UNITED STATES PATENT OFFICE
CERTIFICATE OF CORRECTION

Patent No. 3,459,762      Dated August 5, 1969

Inventor(s) Michael Kokorudz, William K. Langdon, William W. Levis

It is certified that error appears in the above-identified patent and that said Letters Patent are hereby corrected as shown below:

Column 1, line 40, add the words --A is-- prior to the formula:

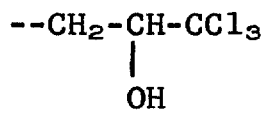

SIGNED AND
SEALED
DEC 2 - 1969

(SEAL)
Attest:

Edward M. Fletcher, Jr.
Attesting Officer

WILLIAM E. SCHUYLER, JR.
Commissioner of Patents